Feb. 13, 1934.    R. M. BANKS ET AL    1,946,474
AUTOMATIC FLUID FEED PROPORTIONING METHOD AND APPARATUS
Filed March 16, 1929    3 Sheets-Sheet 1

INVENTORS
WILMOT W. BURRITT
JOHN H. BANKS
REGINALD M. BANKS
BY
Francis P. Duncan, ATTORNEY

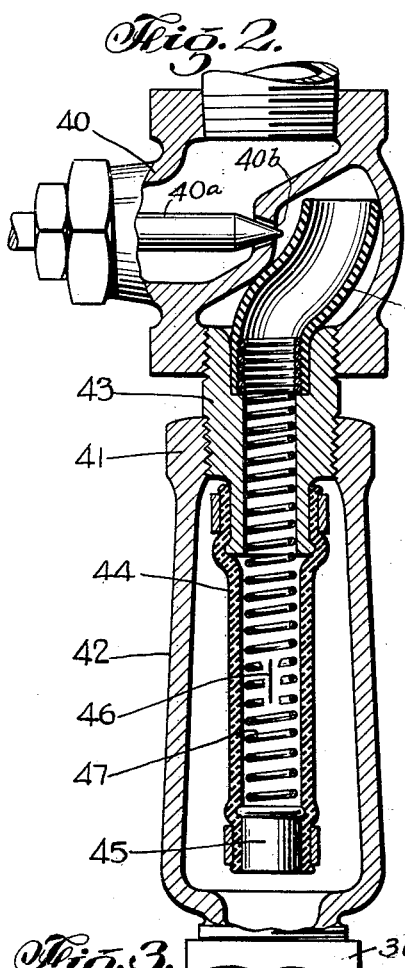
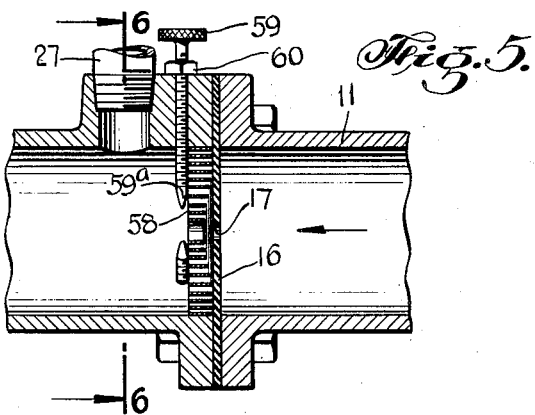
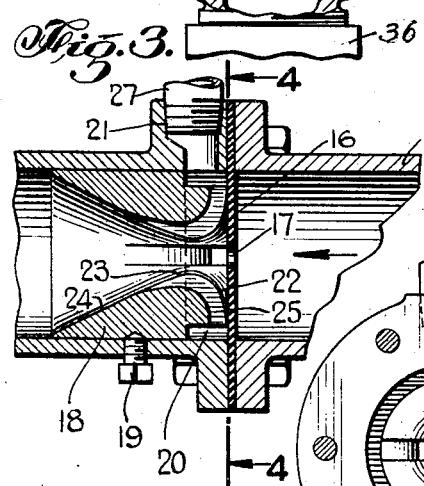
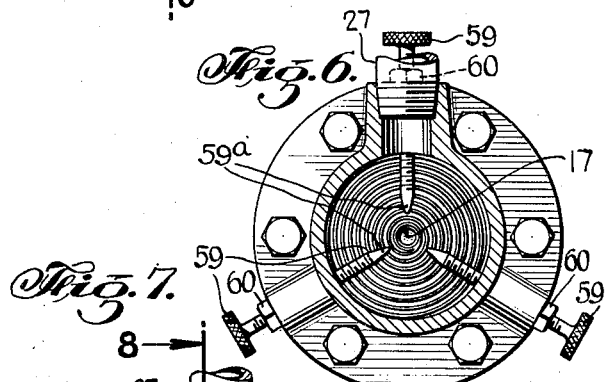
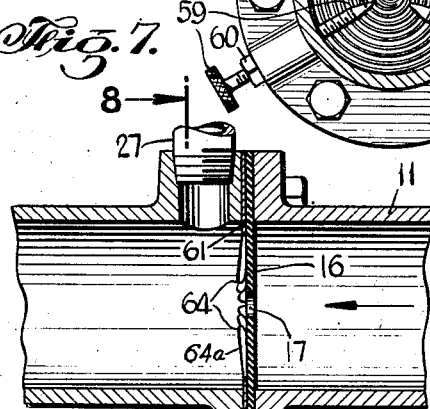
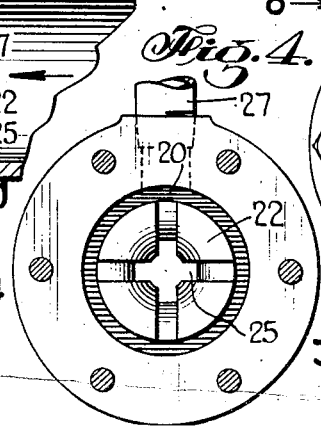
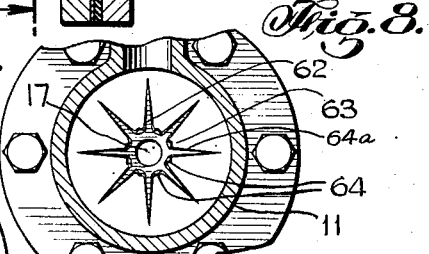

Feb. 13, 1934. R. M. BANKS ET AL 1,946,474
AUTOMATIC FLUID FEED PROPORTIONING METHOD AND APPARATUS
Filed March 16, 1929 3 Sheets-Sheet 3
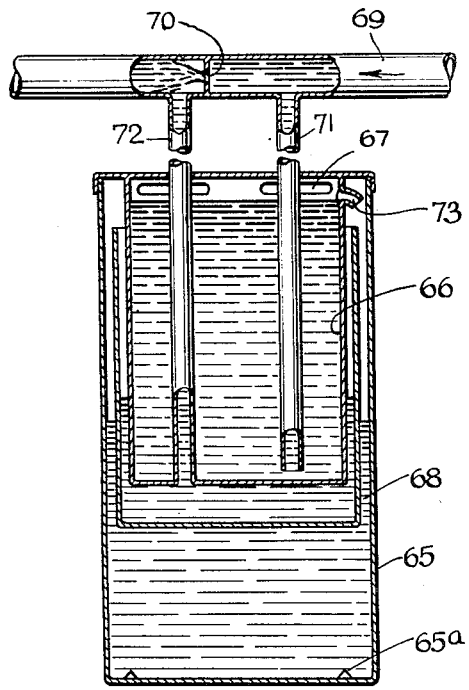
Fig. 9.
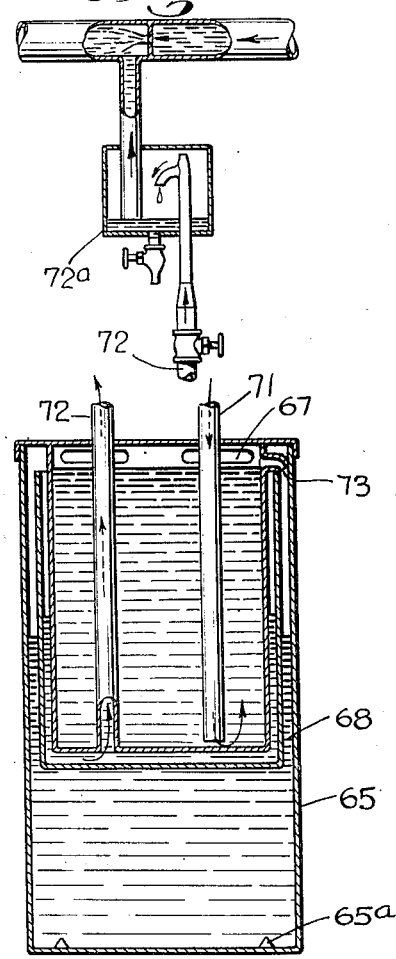
Fig. 10.
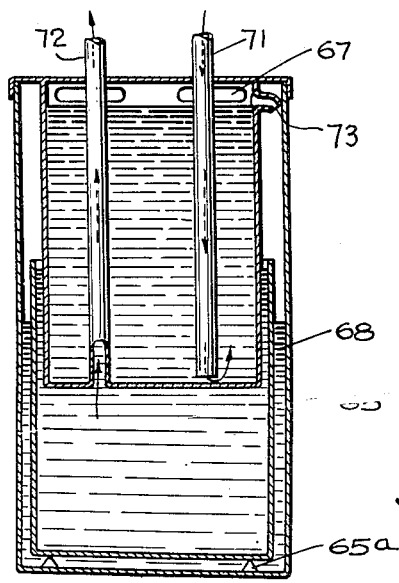
Fig. 11.
Fig. 12.
INVENTORS
WILMOT W. BURRITT
JOHN H. BANKS
REGINALD M. BANKS
BY Frederick S. Duncan
ATTORNEY Patented Feb. 13, 1934

1,946,474

UNITED STATES PATENT OFFICE 1,946,474

AUTOMATIC FLUID FEED PROPORTIONING METHOD AND APPARATUS

Reginald M. Banks, Plainfield, N. J., and John H. Banks, New York, and Wilmot W. Burritt, Brooklyn, N. Y.; Elizabeth Gardner Burritt executrix of said Wilmot W. Burritt, deceased Application March 16, 1929. Serial No. 347,686

29 Claims. (Cl. 210—31)

Our invention relates to improvements in automatic fluid feed proportioning apparatus and has for an object to provide a novel method of feeding one fluid into a moving stream of another fluid in substantially direct proportion to the flow of said stream.

A more specific object of our invention is to provide in connection with a closed fluid pressure system subject to periodic and variable flow, means for feeding fluid into said system in substantially direct proportion to said flow. To this end we effect a localized differential pressure in the system and utilize this differential pressure to feed the fluid into the system.

Such differential pressure is most conveniently obtained by means of a "vena contractor" by which term we mean to define any device, such for instance as an orificed diaphragm or a Venturi tube, for producing a vena contracta. However, the differential pressure produced by the ordinary vena contracta does not vary directly with the velocity of the flow therethrough but more nearly as the square of said velocity, so that if such differential pressure were used there would be wide variations in the feed which would not be directly proportional to the stream flow of the system.

It is an object of our invention to provide a novel means of creating a localized differential pressure in a fluid pressure system which at all times will be substantially proportional to the volume of flow in said system. The draft produced by a vena contractor varies at different points along the vena contracta and it is an object of our invention to utilize this variation to modify the differential pressure. To this end, we provide means for automatically varying the relative position of a piezometer draft tube with respect to the vena contracta in proportion to the flow therein, thereby regulating the difference of pressure between that of the system and that in said draft tube.

The draft produced by a vena contractor also varies with the size of the opening therein and it is an object of our invention to produce a vena contracta which will automatically expand or contract in accordance with variations in the velocity of the flow through the system and thereby modify the localized differential pressure.

In a preferred form of our invention both of the above mentioned methods of modifying the localized differential pressure are employed. The vena contractor comprises an orificed diaphragm of resilient material which will move downstream toward the draft tube as the velocity of the stream increases and will return toward normal position as the velocity ebbs; also, the diaphragm, being of resilient material, will expand as it moves down-stream, increasing the diameter of the orifice, and will contract as it returns to normal, reducing the diameter of the orifice. By a proper selection of either one of the above described variables or by a combination of both of them we are able to maintain a localized differential pressure which is substantially directly proportional to variations of flow in the system.

An embodiment of our invention by which we achieve the above named objects and others which will appear hereinafter, will now be described in connection with the accompanying drawings and the novelty and scope of the invention will thereafter be pointed out in the claims.

Referring to the accompanying drawings:

Fig. 2 is a view, in longitudinal section, of a novel form of valve used in the draft tube of our apparatus.

Fig. 3 is a fragmentary detail view, in longitudinal section, of our improved vena contractor.

Fig. 4 is a view, in cross section, taken on the line 4—4 of Fig. 3.

Fig. 5 is a fragmentary detail view, in longitudinal section, showing a different form of vena contractor.

Fig. 6 is a view, in cross section, taken on the line 6—6 of Fig. 5.

Fig. 7 is a fragmentary detail view, in longitudinal section, of a still different form of vena contractor.

Fig. 8 is a view in section taken on the line 8—8 of Fig. 7.

Fig. 9 is a fragmentary view, in vertical section, and largely diagrammatic, of our apparatus as applied to the feed of a reagent whose specific gravity is lower than that of the fluid in the flowing system.

Fig. 10 is a view in section illustrating a sight feed glass which may be used with the apparatus shown in Fig. 9.

Figs. 11 and 12 are views similar to Fig. 9 but showing the parts in different positions.

Figure 1:
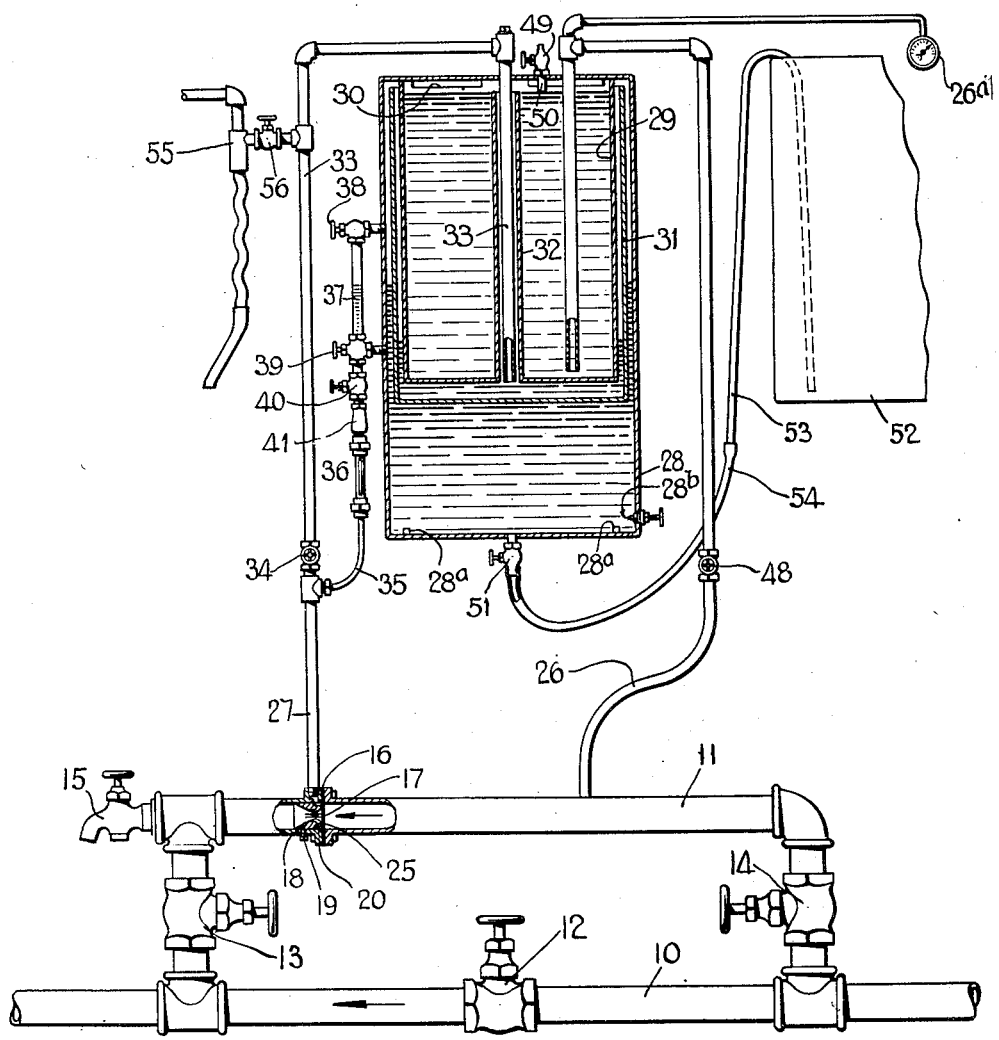
Figure 1 is a view, partly in section and largely diagrammatic, of our improved apparatus for introducing a reagent into a flowing pressure system, the reagent being of higher specific gravity than that of the fluid in the pressure system.

The particular embodiment of our invention chosen for illustration is adapted for introducing a chemical reagent in a water supply system such as is used in a dwelling, apartment house, industrial plant, etc. The flow of water in such a system may vary widely from zero to the maximum capacity of the system, depending upon the number of taps that are opened at any one time, but despite such variations our apparatus will feed the reagent into the system, at all times in substantially direct proportion to the flow of the water.

Referring particularly to Fig. 1, we have shown a water supply pipe 10, provided with a by-pass pipe 11. In the pipe 10, between the legs of the by-pass, there is a valve 12 by which the flow of water may be interrupted, so as to cause a flow through the by-pass pipe 11. The two legs of the by-pass pipe 11 are also provided with valves 13 and 14 respectively, which may be closed when it is desired to cut off the by-pass from the system. A tap 15 is provided at the down-stream end of the by-pass pipe for a purpose which will be explained hereinafter.

The pipe 11 consists of a pair of flanged sections between which is secured a diaphragm 16 (see Fig. 3) formed with a central orifice 17. This diaphragm is preferably made of rubber of such quality and so designed and proportioned that it will expand in response to variations of pressure of the stream against it, but will normally occupy a plane transverse to the by-pass pipe 11.

Rubber, like any other resilient material, will take a set if stretched beyond its elastic limit and in order to prevent the diaphragm from being thus permanently distorted, we provide, in special cases, a backing therefor on the downstream side thereof to limit the expansion of the diaphragm. This backing consists of an annular plug 18 (Fig. 3) which is secured within the pipe 11 by means of a set screw 19. The outer periphery of the plug adjacent the diaphragm is reduced to form an annular recess 20 which communicates with a threaded socket 21 in the pipe 11. The bore of the plug 18 flares outwardly on the side adjacent the diaphragm providing a toric surface 22, so shaped and so placed that it will not obstruct the vena contracta, and against which plug the diaphragm will lie without taking a permanent set when flexed to its maximum extent. The toric surface 22 merges into a throat 23 which is of a diameter slightly greater than that of the orifice 17 when the diaphragm is expanded to its maximum. From the throat 23, the bore of the plug flares outward (as indicated at 24) at such an angle as not to touch the vena contracta produced when water flows through the orifice 17. Cut into the surface 22 and throat 23 are channels 25 which communicate with the recess 20, so that even when the diaphragm 16 is flexed to its utmost and lies against the wall 22 there will be open communication between the recess 20 and the vena contracta.

At a suitable point on the up-stream side of the diaphragm a piezometer pressure tube 26 is provided, and threaded into the socket 21 is a tube 27 which serves as a draft tube to feed reagent into the water ssytem.

The reagent is contained in a sealed tank 28. Fixed within the reagent tank and depending from a point close to the top wall of the reagent tank is an inner tank 29 which for convenience, we shall term the "plug tank". The plug tank has openings 30 at the top so that it is in free communication with the reagent tank. The plug tank is also narrowly spaced from the side walls of tank 28, but widely spaced from the bottom wall thereof.

A third tank 31 is also provided which is adapted to float in the reagent contained in tank 28 and hence, for convenience, will be termed the "float tank". The float tank is open at the top and telescopes the plug tank. The plug tank is provided with a hollow stem 32 which opens through the bottom of the plug tank and reaches to within a short distance of the top of the plug tank. Extending into this stem, but annularly spaced therefrom, is one leg of a siphon 33, which passes through the top of the reagent tank 28, the other leg being directly connected with the draft tube 27. A valve 34 normally closes communication between the siphon 33 and the tube 27. This siphon is adapted for use when emptying the float tank and in filling the reagent tank.

Immediately below the valve 34 the tube 27 is provided with a branch 35 which includes a sight feed glass 36 and a gage glass 37. Valves 38 and 39 disposed at opposite ends of the gage glass, control communication between the tube 35 and the reagent tank 28 at points respectively above and below the normal level of reagent in said tank. A needle valve 40 is also provided above the sight feed glass 36 to regulate the flow of reagent to the pipe 35, and immediately adjacent the needle valve is a check-valve 41.

The ordinary check-valve is too sluggish to meet the peculiar requirements of our apparatus and hence we have devised a special form of valve which will freely pass minute quantities of fluid in one direction and yet will resist a minute as well as a strong flow of fluid in the opposite direction. This valve is clearly shown in Fig. 2. It comprises a casing 42 connected by nipple 43, at its upper end, to the casing of the needle valve 40, while its lower end is connected to the sight feed glass. The nipple 43 is formed with an extension which projects into the casing 42 and has a rubber tube 44 attached thereto. The lower end of the tube is closed by plug 45. In the rubber tube there is a very narrow slit or port 46 which normally is closed and through which fluid may pass outward, but which will prevent fluid from passing inward into the tube.

The valve, as so far described, resembles the well-known Bunsen air valve, but we have found that the Bunsen valve will not operate properly in our apparatus because occasionally there is a back flow of liquid up the draft tube 27 which will collapse the tube 44 and cause the slit 46 to open. In order to prevent collapsing of the tube 44 we reinforce the same with a porous resilient core, which in the particular embodiment illustrated consists of a coil spring 47. The spring is of such normal diameter as to pass freely through the tube 44 except for a few turns at its upper end which are expanded and bedded in a short piece of rubber tube 43a, projecting from the top of the nipple 43. The lower end of the spring 47 stops short of the plug 45. The spring is coiled to such a pitch that when completely compressed its diameter will not be greater than the inner diameter of the tube 44, hence compression of the spring will not cause expansion of the rubber tube 44.

In service we find that the small quantities of fluid fed through the valve will pass freely out through the slit 46 and when there is a movement of liquid in the reverse direction in the draft tube 27, the tube 44, being reinforced by the spring 47, will not collapse, and hence the slit 46 will remain closed. With a valve such as this, a very fine feed of fluid may be maintained in one direction and yet the valve will resist pressures tending to cause a flow therethrough in the opposite direction.

The needle valve 40 is of common construction comprising a needle 40a which is adjustable in an orifice 40b formed in a transverse wall of the valve casing. We have found that when feeding small quantities of liquid with our apparatus the head of liquid is not sufficiently high to force drops of reagent through the orifice 40b unless the orifice be submerged in liquid. For this reason, we employ the tube section 43a which enters the casing of the needle valve and projects therein to a point above the orifice 40b. As a result, the casing of the needle valve on the down-stream side of the partition 40b will be filled with liquid up to the level of the top of the rubber tube 43a. Hence, the orifice 40b will always be submerged in liquid and thereby any resistance due to surface tension will be avoided.

The tube 26 has a valve 48 therein and leads through the top of the reagent tank into the plug tank 29, extending to a point adjacent the bottom of the plug tank. An air valve 49 is provided in the top of the tank 28. This air valve communicates with a short tube 50 which terminates in the plane of the top of the stem 24.

In the bottom of the tank 28 there is a valve 51 which may be opened to drain out the tank and through which reagent may be introduced into the tank. The tank is preferably provided with lugs 28a upon which the float tank 31 will rest when the reagent tank is empty. These lugs serve to space the float tank from the bottom of the reagent tank and thereby prevent the float tank from sealing the valve 51. Near the bottom of the tank 28 we provide a feeler for determining whether the float tank is at or near its lowest position and the apparatus needs to be refilled with reagent. The feeler consists of a threaded rod 28b which passes through a stuffing box into the tank 28.

Adjacent the apparatus is a reservoir 52 from which reagent may be withdrawn to fill the tank 28 to the desired level. For this purpose a siphon 53 is employed which may be connected by a tube 54 to the valve 51.

The steps by which the apparatus is filled are as follows:

The valve 12 should be open during the filling operation so as not to interrupt the flow through the service pipe but all the other valves are closed to start with. The siphon 53 is inserted in the reagent reservoir 52 and is connected by tube 54 to the valve 51. To draw reagent from the reservoir 52 into the reagent tank 28 a partial vacuum is produced in the latter as follows:

Valves 14, 15, and 34 are opened, and also the gage glass valves 38 and 39. Water then flows through the by-pass pipe 11 and in passing through the orificed diaphragm produces a draft on the tube 27 which draws air out of the tank 28, producing a partial vacuum. The valve 51 is then opened and reagent is drawn through the siphon 53 into the tank 28. As the reagent rises in tank 28, it floats the tank 31. The filling of the tank 28 continues until the reagent rises to a predetermined level, as shown in the gage glass 37. Then the valves 34 and 51 are closed and also the bleeder cock valve 15, thereby stopping the operation of the vena contractor.

The next step is to introduce water into the plug tank 29 and thereby compress the air in the tanks to a pressure equal to that of the service system. To this end the valve 48 is opened and water will then flow through the pipe 26 into the tank 29, partially filling the latter to a point which is determined by the compression of the air within the tanks. The next step is to crack open the valve 49 permitting the excess air in the tanks to escape and the plug tank 29 to fill with water. As soon as the water rises to the lower end of the tube 50, and hence to the top of the stem 32, it will be forced through the valve 49, thereby indicating that the plug tank has been completely filled. The valve 49 is then closed and the filling operation is completed.

The next step is to calibrate the apparatus so as to obtain the desired feed of reagent. The bleeder cock 15 is opened, producing a draft on the tube 27 and at the same time the needle valve 40 is adjusted so that a predetermined number of drops of reagent will pass through the sight feed for a given discharge of water through the bleeder cock. After this regulation of the needle valve has been effected, the bleeder cock 15 is closed, valve 13 opened, and valve 12 closed, so that water will now by-pass said valve and flow through the pipe 11.

While we may use the vena contractor to produce a partial vacuum in the tank 28 and thereby draw reagent into said tank, it will be obvious that this partial vacuum may be produced in other ways. As an additional means for producing the partial vacuum in the tank 28, we provide a Bunsen pump 55 which is connected with a suitable source of water supply and has its suction port connected through a valve 56 to the siphon 33. When desired the valve 56 may be opened and the Bunsen pump operated to produce a partial vacuum in the tank 28, which will draw reagent therein from the reservoir 52. It will also be obvious that we may employ gravity to force the reagent into the tank 28, this being done by raising the level of the reservoir 52 and drawing the reagent from the bottom of said reservoir.

It will now be observed that under static conditions in the service system, a perfect balance may be maintained between the water leg on the up-stream side of the diaphragm and the reagent leg on the down-stream side. In the drawings we depict an apparatus in which the specific gravity of the reagent is considerably greater than that of water, and the two liquids will be in a hydrostatic balance, with the reagent head proportionately shorter than the water head. In the drawings the water head is measured from the top of the pipe 11 to the top of the stem 32, or in other words, to the maximum level of water in the plug tank, and the reagent head is measured from the top of the pipe 11 to the liquid level in the reagent tank 28, as shown in the gage glass, allowance being made for the air gap present in the reagent leg by reason of the sight feed glass air pocket. This balance will obtain as long as there is no flow of water through the pipe 11. When, however, any water is drawn from the system and water flows through the diaphragm 16, the pressure balance on the two legs is disturbed and the draft on the reagent tube 27 will create a pressure differential between the water leg and the reagent leg. This differential pressure will force a certain amount of reagent out of the tube 27 and into the system, and at the same time an equal quantity of water, passing out the water leg, will overflow into the float tank, increasing the submergence of the latter and thus maintaining the level of reagent in the tank 28 despite the withdrawal of reagent therefrom. As explained above, owing to expansion and contraction of the orifice 17 and movement of the diaphragm toward and from the draft tube 27, the differential pressure will always be substantially directly proportional to the flow through the pipe 11.

It will be noted that as a certain volume of reagent passes out of the reagent tank into the system, an equal volume of water enters the plug tank and overflows into the float tank and the float tank serves as a means to separate the reagent from the water. Were it not for the fact that the plug tank 29 projects into the float tank 31, there would be a considerable lowering of level in the reagent tank as the reagent was displaced by equal volumes of water because the water is of lower specific gravity than the reagent, but the dimensions of the tanks are so chosen that the float tank is depressed not merely by the weight of the water therein but by the hydrostatic head which is increased by partial submergence of the plug tank. Hence the water added to the float tank, although lighter than the equal volume of reagent, exerts an approximately equivalent hydrostatic head and depresses the float tank by an amount necessary to maintain a substantially constant level of reagent in the reagent tank.

When the apparatus has run until the float tank rests upon the lugs 28a it will be necessary to refill the reagent tank. This condition will be indicated by lowering of level in the gage glass 37 or by the feeler rod 28b. The valves 13 and 14 are closed and valve 12 opened and the needle valve 40 is also closed. Then the bleeder cock 15 is opened and because valve 48 has been allowed to remain open the air pressure in the tanks will start and cause the water to siphon out of the plug tank by way of tube 26. The air vent 49 is opened as the pressure in the plug tank approaches zero. To determine pressure conditions in the apparatus a gage 26a may be connected to the top of the tube 26. After the plug tank has been emptied the remaining steps are the same as described above in connection with the initial filling.

In Figs. 5 and 6 we show a different form of vena contractor adapted to be used in our apparatus. In this form the plug 18 is dispensed with and in lieu thereof we provide one or more flat spiral springs 58 on the down-stream side of the diaphragm 16. These spiral springs are formed of a ribbon of spring metal which tapers from a larger width at the outer end of the spring to a smaller width at the inner end of the spring. Because of this taper the spring is dished on one side adjacent the diaphragm 16, while the other side of the spring lies in a plane which is at right angles to the axis of the pipe 11.

As the diaphragm 16 is flexed by a flow of water through the orifice 17 it will be supported by the spring 58 and will also force the spring 58 out of its normal plane in the down-stream direction. The spring resists such flexure and thus provides a resilient support for the diaphragm and assists in restoring the diaphragm to its normal position when the flow ceases. It also prevents the diaphragm from being flexed beyond its elastic limit.

In connectiton with this construction, we provide means for regulating the resistance offered by the spring 58 to flexure of the diaphragm. To this end, a number of set screws 59 are provided which are threaded radially through the pipe 11 and may be adjusted inward or outward to any desired extent. The ends of these set screws are preferably tapered as indicated at 59a. By adjusting these set screws, the number of turns or coils of the spring which are free to flex outward, may be increased or reduced at will, thereby varying the spring resistance to the flexure of the diaphragm 16. The set screws may be held at any desired adjustment by means of lock nuts 60.

In Figs. 7 and 8 we illustrate still another form of vena contractor. In this case, in place of using a spiral spring as a backing for the diaphragm 16, we employ a disk 61 of spring metal. The disk has a central aperture larger than the orifice 17 when expanded, and radiating from the orifice are slits 62 which cut the disks into a number of sectors 63, as best shown in Fig. 8. These sectors are spaced apart at their inner ends but are integrally joined at their opposite ends. The inner or free ends of the sectors and their edges are bent outward or in the down-stream direction as indicated at 64 and 64a respectively.

In use the diaphragm 16 will flex down-stream in response to a flow through the orifice 17 and the sectors 63 will tend to resist flexure of the diaphragm, preventing the diaphragm from being expanded beyond its elastic limit. The points 64 and edges 64a are turned outward so as to eliminate the danger of abrading the rubber.

The apparatus for introducing into a pressure system a reagent of lower specific gravity then the fluid of the system, is illustrated somewhat diagrammatically in Figs. 9 to 12. In these drawings various valves, gages, vents, etc. are omitted for the purpose of simplifying the drawings, but it will be readily understood by anyone skilled in the art, particularly in view of the description of the apparatus shown in Fig. 1, how such valves and auxiliary devices may be applied.

In general, the apparatus operates on the same principles as those employed in the previously described apparatus. Three tanks are used, one of which is a water tank and another a float tank, but in this case the float tank contains the reagent and floats in the water tank. Thus a tank 65 is used which corresponds to the tank 28, but which in this case contains water instead of reagent. A plug tank 66 is secured within the tank 65 but is in open communication therewith at the top through openings 67. The plug tank is telescoped by the float tank 68 which in this case is adapted to receive the reagent. A by-pass pipe 69 may be connected to the water system in the same manner as is the by-pass pipe 11 and is similarly provided with a flexible, orificed diaphragm 70 which like diaphragm 16 may be suitably adapted to prevent flexure beyond its elastic limit. The by-pass pipe 69 is located above the tanks and on the up-stream side of the diaphragm 44 there is a pressure tube 71 which leads into the plug tank with its lower open end close to the bottom of said tank. A draft tube 72 leads from a point adjacent the down-stream side of the diaphragm 70 through the tank 66 and opens into the float tank 68. Near the top of the plug tank 66 there is a spout 73 through which water may overflow from the plug tank into the water tank 65, clearing the float tank 68. A sight feed glass 72a, such as shown in Fig. 10, may be introduced in the draft tube 72.

The initial positions of the tanks are substantially as shown in Fig. 11. The plug tank is filled with water to the level of the spout 73. The reagent tank which rests on lugs 65a at the bottom of tank 65 is filled with the requisite amount of reagent. The system of tanks is subjected to air pressure equal to the pressure of the service system and a hydrostatic balance is established between the water leg 71 and the reagent leg 72.

The reagent being of lower specific gravity than water must necessarily have a proportionately longer column than the water. The water head is measured from the bottom of the pipe 69 to the level of water in the plug tank and the reagent head from the bottom of the pipe 69 to the level of reagent in the tank 68.

As long as there is no flow through the diaphragm 70 the water head will exactly balance the reagent head, but as soon as a flow is established there will be a differential pressure tending to draw reagent up the tube 72 and discharge water down the tube 71. The water discharging from the tube 71 will overflow through the spout 73 into the tank 65 raising the float tank 68 and thereby maintaining a substantially constant level of reagent in the float tank with respect to the pipe 69, or, in other words, maintaining an approximately constant reagent head. As in the apparatus shown in Fig. 1, the plug tank compensates for the lower specific gravity of the reagent. Thus, while the water added to the water tank 65 and the reagent withdrawn from the float tank are equal in volume they differ in weight and the float tank is not lightened in direct proportion to the rise of water level in tank 65. Hence, if no plug tank were present the "net level" of reagent (that is the level with respect to the by-pass pipe as distinguished from the "tank level" or depth of reagent in the float tank) would fall, thereby increasing the head of the reagent leg 72, but the tank level of the reagent is modified by submergence of the plug tank so as to maintain the net level of the reagent substantially constant. Fig. 12 shows the position of the parts when the reagent tank is practically empty, but the net level of the reagent is approximately the same as that in Fig. 11. Fig. 9 shows the relative position of the parts in an intermediate position and the net level is still approximately the same as in Figs. 11 and 12.

While we have described and illustrated certain embodiments of our invention it will be understood that these are merely illustrative and not limitative of our invention and that we are at liberty to make such changes in form, construction and arrangements as fall within the spirit and scope of the appended claims.

We claim:

1. In the method of introducing a fluid into a stream of variable flow in substantially direct proportion to said flow, the steps which consist in producing a localized differential pressure in said stream substantially directly proportional to said flow and utilizing said pressure to feed said fluid into said stream.

2. In the method of producing in a channel communicating with a stream, pressure variations substantially directly proportional to variations of flow in said stream, the steps which consist in forming a vena contracta in the stream substantially at the point of communication with the channel and varying the position of the vena contracta relatively to said channel in predetermined proportion to said variations of flow.

3. In the method of producing in a channel communicating with a stream, pressure variations substantially directly proportional to variations of flow in said stream, the steps which consist in forming a vena contracta in the stream substantially at the point of communication with the channel, and varying the dimensions of the vena contracta in predetermined proportion to said variations of flow.

4. In the method of producing in a channel communicating with a stream, pressure variations substantially directly proportional to variations of flow in said stream, the steps which consist in forming a vena contracta in the stream substantially at the point of communication with the channel, and utilizing said variations of flow proportionately to vary the relative position of the channel and the vena contracta.

5. In the method of producing in a channel communicating with a stream, pressure variations substantially directly proportional to variations of flow in said stream, the steps which consist in forming a vena contracta in the stream substantially at the point of communication with the channel and utilizing said variations of flow proportionately to vary the size of the vena contracta.

6. In the method of producing in a channel communicating with a stream, pressure variations substantially directly proportional to variations of flow in said stream, the steps which consist in forming a vena contracta in the stream substantially at the point of communication with the channel, and varying the size of the vena contracta and its position with respect to the channel in predetermined proportion to said variations of flow.

7. In the method of producing in a channel communicating with a stream, pressure variations substantially directly proportional to variations of flow in said stream, the steps which consist in forming a vena contracta in the stream substantially at the point of communication with the channel, and utilizing said variations of flow to vary in predetermined proportion the size of the vena contracta and the relative position of the channel and the vena contracta.

8. In the method of feeding a fluid into a stream in a closed pressure system, the steps which consist in providing a body of the feed-fluid and a body of the stream-fluid, floating one of said bodies upon the other, subjecting both bodies to the normal pressure of said system, providing two fluid columns connected with the stream, one of said columns having a fixed hydrostatic head and adapted to discharge into the stream-fluid body and the other column connected with the feed-fluid body, said columns being normally hydrostatically balanced, and establishing a localized differential pressure in the stream between said columns so that said balance will be disturbed, thereby causing fluid from the feed-fluid body to be drawn into the stream and an equal volume of fluid from the stream to be discharged into said stream-fluid body, whereby a substantially constant hydrostatic head will be maintained in the feed-fluid column.

9. In the method of feeding into a stream of fluid in a closed pressure system, a fluid of different specific gravity from that of the stream fluid, the steps which consist in providing a body of the feed-fluid and a body of the stream-fluid, floating one of said bodies upon the other, subjecting both of said bodies to the normal pressure of said system, providing two fluid columns connected with the stream, one of said columns having a fixed hydrostatic head and adapted to discharge into said body of stream fluid and the other column containing feed-fluid and connected with the feed-fluid body, the hydrostatic heads of the respective columns being normally inversely proportional to the specific gravities of the two fluids, establishing a localized differential pressure in the stream between said two columns, utilizing said differential pressure to draw fluid from the feed-fluid body into the stream and to discharge a volumetric equivalent of stream-fluid from said stream into said stream-fluid body, and compensating for differences of specific gravity in the two fluids to maintain a substantially fixed hydrostatic head in the feed-fluid column.

10. In the method of feeding into a stream of fluid in a closed pressure system, a fluid of different specific gravity from that of the stream-fluid, the steps which consist in providing a body of feed-fluid and a body of stream-fluid, one of said bodies exerting pressure upon the other, providing two fluid columns connected with the stream, one of said columns having a fixed hydrostatic head and adapted to discharge into said body of stream fluid and the other column containing feed-fluid and connected with the feed-fluid body, the hydrostatic heads of the respective columns being inversely proportional to the specific gravities of the two fluids, establishing a localized differential pressure in the stream between said columns, utilizing said differential pressure to draw fluid from the feed-fluid body into the stream and to discharge the volumetric equivalent of fluid from the stream into said stream-fluid body, and modifying the pressure of one body upon the other to compensate for said difference in specific gravity so as to maintain the hydrostatic head of the feed fluid column substantially constant.

11. In the method of feeding into a fluid stream in a closed pressure system another fluid in substantially direct proportion to the flow of said stream, the steps which consist in subjecting a body of the feed fluid to the same pressure as that of the system, developing a differential pressure in the stream substantially directly proportional to the flow therein, utilizing said differential pressure to draw predetermined volumes of fluid into the stream from said feed fluid body and discharge equal volumes of the stream fluid, and using the discharged stream fluid to maintain a substantially constant pressure head in the body of feed fluid.

12. In the method of feeding into a fluid stream in a closed pressure system and in substantially direct proportion to the flow of said stream, another fluid of different specific gravity from the stream fluid, the steps which consist in subjecting a body of the feed fluid to the same pressure as that of the system, developing a differential pressure in the stream substantially directly proportional to the flow therein, utilizing said differential pressure to draw feed fluid from said body into the stream and discharge equal volumes of the stream fluid, using the discharged stream fluid to produce pressure upon the body of the feed fluid, and modifying the pressure of said discharged fluid to compensate for said difference of specific gravity whereby the feed fluid will be maintained at a predetermined pressure head.

13. In the method of feeding into a fluid stream in a closed pressure system and in substantially direct proportion to the flow of said stream, another fluid of different specific gravity from the stream fluid, the steps which consist in subjecting a body of the feed fluid to the same pressure as that of the system, developing a differential pressure in the stream substantially directly proportional to the flow therein, utilizing said differential pressure to draw a volume of the feed fluid into the stream and discharge an equal volume of the stream fluid, floating the discharged fluid on the body of feed fluid, and modifying the pressure of said discharged fluid to compensate for said difference of specific gravity so that the feed fluid will be maintained substantially at a predetermined pressure head.

14. An apparatus for feeding a fluid into another fluid in a closed pressure system, said apparatus comprising a fluid conduit communicating with the pressure system, a receptacle for a supply of feed fluid and adapted to contain air at a pressure equal to that of the conduit, a draft tube for conveying feed fluid from said supply into the conduit, a pressure tube extending from the conduit to the receptacle, means for maintaining a substantially constant hydrostatic head in the pressure tube to normally balance the hydrostatic head of feed fluid in the draft tube, and a vena contractor in the conduit between said tubes and adapted to disturb said balance when fluid flows through the conduit, thereby drawing feed fluid from the supply into the conduit and discharging fluid from the conduit into the receptacle to replace the feed fluid withdrawn therefrom and maintain a substantially constant hydrostatic head in the draft tube.

15. An apparatus for feeding a fluid into another fluid in a closed pressure system, said apparatus comprising a fluid conduit communicating with the pressure system, a receptacle for a supply of feed fluid and adapted to contain air at a pressure equal to that of the conduit, a draft tube for conveying feed fluid from said supply into the conduit, a pressure tube extending from the conduit to the receptacle, means for maintaining a substantially constant hydrostatic head in the pressure tube to normally balance the hydrostatic head of feed fluid in the draft tube, and means for producing differential pressure between said tubes by the flow of fluid through the conduit and varying said differential pressure substantially in direct proportion to variations of said flow, thereby drawing feed fluid from the supply into the conduit and discharging fluid from the conduit into the receptacle to replace the feed fluid withdrawn therefrom and maintain a substantially constant hydrostatic head in the draft tube.

16. An apparatus for feeding a fluid into another fluid in a closed pressure system, said apparatus comprising a fluid conduit communicating with the pressure system, a receptacle for a supply of feed fluid and adapted to contain air at a pressure equal to that of the conduit, a draft tube for conveying feed fluid from said supply into the conduit, a pressure tube extending from the conduit to the receptacle, means for maintaining a substantially constant hydrostatic head of feed fluid in the draft tube, means for producing differential pressure between said tubes by the flow of fluid through the conduit and varying said differential pressure substantially in direct proportion to variations of said flow, thereby drawing feed fluid from the supply into the conduit and discharging fluid from the conduit into the receptacle to replace the feed fluid withdrawn therefrom and maintain a substantially constant hydrostatic head in the draft tube, and means for regulating the rate of feed per volume of fluid flowing through the conduit.

17. An apparatus for feeding a fluid into another fluid in a closed pressure system, said apparatus comprising a fluid conduit communicating with said system, a receptacle for the feed fluid and adapted to contain air at a pressure equal to that of the conduit, a draft tube for conveying feed fluid from the receptacle into the conduit, a pressure tube extending from the conduit to the receptacle, means for maintaining a substantially constant head in the pressure tube to normally balance the hydrostatic head of feed fluid in the draft tube, a vena contractor in the conduit between said tubes and adapted to disturb said balance when fluid flows through the conduit, thereby drawing feed fluid from the receptacle and discharging fluid from the conduit into the receptacle to replace the feed fluid withdrawn therefrom, and means for keeping the fluids separate in the receptacle but in pressure contact with each other.

18. An apparatus for feeding a fluid into another fluid of different specific gravity in a closed pressure system, said apparatus comprising a fluid conduit communicating with said system, a receptacle for a supply of the feed fluid and adapted to contain air at a pressure equal to that of the system, a draft tube for conveying feed fluid from the receptacle into the conduit, a pressure tube extending from the conduit to the receptacle, means for maintaining a substantially constant hydrostatic head of feed fluid in the draft tube, a vena contractor in the conduit between said tubes and adapted to disturb said balance when fluid flows through the conduit, thereby drawing feed fluid into the conduit from the supply and discharging fluid in equal volume from the conduit into the receptacle to replace the feed fluid withdrawn therefrom, and means for compensating for the difference in specific gravity of the fluids to maintain the hydrostatic head in the draft tube substantially constant.

19. An apparatus for feeding a fluid into another fluid in a closed pressure system, said apparatus comprising a fluid conduit communicating with said system, a receptacle for a supply of the feed fluid and adapted to contain air at a pressure equal to that of the system, a float tank in the receptacle, a draft tube for conveying feed fluid from the receptacle into the conduit, a pressure tube extending from the conduit and adapted to discharge into the float tank, means for maintaining a substantially constant hydrostatic head in the pressure tube to normally balance the hydrostatic head of feed fluid in the draft tube, and a vena contractor in the conduit between said tubes and adapted to disturb said balance when fluid flows through the conduit, thereby drawing feed fluid into the conduit from the supply and discharging fluid in equal volume from the conduit into the float tank to compensate for the feed fluid withdrawn from the receptacle and maintain a substantially constant hydrostatic head in the draft tube.

20. An apparatus for feeding a fluid into another fluid of lower specific gravity in a closed pressure system, said apparatus comprising a fluid conduit communicating with said system, a receptacle for the feed fluid and adapted to contain air at a pressure equal to that of the system, a float tank in the receptacle, a fixed plug tank projecting into the float tank, a draft tube for conveying feed fluid from the receptacle into the conduit, a pressure tube extending from the conduit and adapted to discharge into the float tank, means for maintaining a substantially constant hydrostatic head of feed fluid in the draft tube, and a vena contractor in the conduit between said tubes and adapted to disturb said balance when fluid flows through the conduit, thereby drawing feed fluid into the conduit from the receptacle and discharging fluid in equal volumes from the conduit into the float tank to replace the feed fluid withdrawn from the receptacle, the plug tank being of such dimensions as to increase the hydrostatic pressure of the fluid in the float tank by submergence therein so as to compensate for the lower specific gravity of the fluid in the float tank.

21. An apparatus for feeding a fluid into another fluid of lower specific gravity in a closed pressure system, said apparatus comprising a fluid conduit communicating with said system, a receptacle for the feed fluid and adapted to contain air at a pressure equal to that of the system, a float tank in the receptacle, a fixed plug tank projecting into the float tank, a draft tube for conveying feed fluid from the receptacle into the conduit, a pressure tube extending from the conduit and adapted to discharge into the float tank, means for maintaining a substantially constant hydrostatic head of feed fluid in the draft tube, and means for producing differential pressure between said tubes by the flow of fluid through the conduit and varying said differential pressure substantially in direct proportion to variations of said flow, thereby drawing feed fluid into the conduit from the receptacle and discharging fluid in equal volume from the conduit into the float tank to replace the feed fluid withdrawn from the receptacle, the plug tank being of such dimensions as to increase the hydrostatic pressure of the fluid in the float tank by submergence therein so as to compensate for the lower specific gravity of the fluid in the float tank.

22. An apparatus for feeding a fluid into another fluid of lower specific gravity in a closed pressure system, said apparatus comprising a fluid conduit communicating with said system, a receptacle for the feed fluid and adapted to contain air at a pressure equal to that of the system, a float tank in the receptacle, a fixed plug tank projecting into the float tank, a draft tube for conveying feed fluid from the receptacle into the conduit, a pressure tube extending from the conduit and adapted to discharge into the float tank, means for maintaining a substantially constant hydrostatic head of feed fluid in the draft tube, means for producing differential pressure between said tubes by the flow of fluid through the conduit and varying said differential pressure substantially in direct proportion to variations of said flow, thereby drawing feed fluid into the conduit from the receptacle and discharging fluid in equal volume from the conduit into the float tank to replace the feed fluid withdrawn from the receptacle, the plug tank being of such dimensions as to increase the hydrostatic pressure of the fluid in the float tank by submergence therein so as to compensate for the lower specific gravity of the fluid in the float tank, and means for regulating the rate of feed per volume of fluid flowing through the conduit.

23. Apparatus for feeding one fluid into a confined stream of another fluid, said apparatus comprising a conduit for the latter fluid, a receptacle for a supply of the feed fluid, a vena contractor in the conduit, and a draft tube leading from the receptacle to the conduit in the low pressure region produced by the vena contractor to draw feed fluid from the receptacle into the conduit, said vena contractor being movable toward and from said tube by variations of flow in the conduit in such ratio that variations of the draft in said tube will be substantially directly proportional to the flow in the conduit.

24. Apparatus for feeding one fluid into a confined stream of another fluid, said apparatus comprising a conduit for the latter fluid, a receptacle for a supply of the feed fluid, a vena contractor in the conduit, and a draft tube leading from the receptacle to the conduit in the low pressure region produced by the vena contractor to draw feed fluid from the receptacle into the conduit, said vena contractor comprising an orificed diaphragm of resilient material adapted to be flexed toward and from the tube by variations of flow in said conduit in such ratio that the feed fluid introduced through the draft tube will be substantially directly proportional to the flow through the orifice in the diaphragm.

25. Apparatus for feeding one fluid into a confined stream of another fluid, said apparatus comprising a conduit for the latter fluid, a receptacle for a supply of the feed fluid, a vena contractor in the conduit, a draft tube leading from the receptacle to the conduit in the low pressure region produced by the vena contractor to draw feed fluid from the receptacle into the conduit, said vena contractor consisting of an orificed diaphragm of resilient material adapted to be flexed toward and from the tube by variations of flow in said conduit, and means for controlling the flexure of the diaphragm so that the feed fluid introduced through the draft tube will be directly proportional to the flow through the orifice and the diaphragm.

26. Apparatus for feeding one fluid into a confined stream of another fluid, said apparatus comprising a conduit for the latter fluid, a receptacle for a supply of the feed fluid, a vena contractor in the conduit, a draft tube leading from the receptacle to the conduit in the low pressure region produced by the vena contractor to draw feed fluid from the receptacle into the conduit, said vena contractor comprising an orificed diaphragm formed of resilient material whereby variations of flow in the conduit will cause corresponding flexure of the diaphragm toward and from the draft tube and corresponding expansion and contraction of the orifice, the resiliency of the material being so chosen that the draft on the tube will be varied in substantially direct proportion to variation of flow through the conduit.

27. An apparatus for feeding one fluid into a confined stream of another fluid, said apparatus comprising a conduit for the latter fluid, a receptacle for a supply of the feed fluid, a vena contractor in the conduit, a draft tube leading from the receptacle to the conduit in the low pressure region produced by the vena contractor, a pressure tube leading from the high pressure side of the vena contractor to the receptacle, said vena contractor being movable toward and from said draft tube by variation of flow in the conduit in such ratio that the variations of draft in the draft tube will be substantially directly proportional to the flow in the conduit.

28. An apparatus for feeding one fluid into a confined stream of another fluid, said apparatus comprising a conduit for the latter fluid, a receptacle for a supply of the feed fluid, a vena contractor in the conduit, a draft tube leading from the receptacle to the conduit in the low pressure region produced by the vena contractor, a pressure tube leading from the high pressure side of the vena contractor to the receptacle, said vena contractor consisting of an orificed diaphragm of resilient material adapted to be flexed toward and from the draft tube by variations of flow in said conduit and in such ratio that the feed fluid introduced through the draft tube will be substantially directly proportional to the flow through the orifice of the diaphragm.

29. An apparatus for feeding one fluid into a confined stream of another fluid, said apparatus comprising a conduit for the latter fluid, a receptacle for a supply of the feed fluid, a vena contractor in the conduit, a draft tube leading from the receptacle to the conduit in the low pressure region produced by the vena contractor, a pressure tube leading from the high pressure side of the vena contractor to the receptacle, said vena contractor consisting of an orificed diaphragm of resilient material adapted to be flexed toward and from the draft tube by variations of flow in said conduit, and means for controlling the flexure of the diaphragm so that the feed fluid introduced through the draft tube into the conduit will be substantially directly proportional to the flow of fluid through the orifice of the diaphragm

REGINALD M. BANKS.
JOHN H. BANKS.
WILMOT W. BURRITT.